United States Patent
Mastrianni et al.

(10) Patent No.: US 10,732,023 B2
(45) Date of Patent: Aug. 4, 2020

(54) MEASUREMENT SYSTEM FOR AIRCRAFT, AIRCRAFT HAVING THE SAME, AND METHOD OF MEASURING WEIGHT FOR AIRCRAFT

(71) Applicant: Sikorsky Aircraft Corporation, Stratford, CT (US)

(72) Inventors: Michael G. Mastrianni, Orange, CT (US); John H. Judge, Woodbury, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 674 days.

(21) Appl. No.: 15/445,187

(22) Filed: Feb. 28, 2017

(65) Prior Publication Data

US 2017/0322069 A1    Nov. 9, 2017

Related U.S. Application Data

(60) Provisional application No. 62/312,809, filed on Mar. 24, 2016.

(51) Int. Cl.
| | | |
|---|---|---|
| *G01G 19/07* | (2006.01) | |
| *G01G 19/12* | (2006.01) | |
| *G01M 1/12* | (2006.01) | |
| *B64C 25/32* | (2006.01) | |
| *B64C 25/00* | (2006.01) | |

(52) U.S. Cl.
CPC .......... *G01G 19/07* (2013.01); *B64C 25/001* (2013.01); *G01G 19/12* (2013.01); *B64C 2025/325* (2013.01); *G01M 1/125* (2013.01)

(58) Field of Classification Search
None
See application file for complete search history.

(56) References Cited

U.S. PATENT DOCUMENTS 4,550,385 A * 10/1985 Pulk ................. G01G 19/07
                                                                116/34 R
5,421,204 A    6/1995 Svaty, Jr.
(Continued)

FOREIGN PATENT DOCUMENTS

EP    2409916 A2    1/2012
EP    2441677 A2    4/2012
(Continued)

OTHER PUBLICATIONS

Extended European Search Report for Application No. /Patent No. 15874326.0-1010/3237833, dated May 16, 2018 (10 pp.).
(Continued)

*Primary Examiner* — Gregory J Toatley, Jr.
*Assistant Examiner* — Brandon J Becker
(74) *Attorney, Agent, or Firm* — Cantor Colburn LLP (57) ABSTRACT

A system for weight measurement for an aircraft having a weight on wheels threshold between a flight mode and a ground mode includes a weight on wheels sensor arrangeable on a landing gear assembly of the aircraft, and a computing device receiving first detected data from the sensor related to strain on the landing gear assembly. The computing device calculates a rate of change of the strain over time to determine when the landing gear assembly reaches the weight on wheels threshold. The system also measures aircraft gross weight in a static condition.

14 Claims, 3 Drawing Sheets

(56) References Cited

U.S. PATENT DOCUMENTS

| | | | |
|---|---|---|---|
| 5,726,744 | A | 3/1998 | Ferdinand et al. |
| 6,415,242 | B1 | 7/2002 | Weldon, Jr. et al. |
| 6,676,075 | B2 | 1/2004 | Cowan et al. |
| 7,188,535 | B1 | 3/2007 | Spletzer |
| 7,973,914 | B2 | 7/2011 | Omichi et al. |
| 8,235,326 | B2 | 8/2012 | Briancourt et al. |
| 8,818,739 | B2* | 8/2014 | Zakrzewski ............ B64C 25/00 702/42 |
| 8,839,675 | B2 | 9/2014 | Miller et al. |
| 2008/0119967 | A1* | 5/2008 | Long ...................... G01G 19/07 701/3 |
| 2012/0012699 | A1 | 1/2012 | Eriksen |
| 2012/0046865 | A1 | 2/2012 | Heisig et al. |
| 2013/0340511 | A1* | 12/2013 | Miller ................... G01G 19/07 73/65.05 |
| 2014/0347674 | A1* | 11/2014 | Anderson .............. G01B 11/14 356/614 |
| 2015/0316438 | A1* | 11/2015 | Nance ................... G01M 1/125 701/3 |
| 2017/0116617 | A1* | 4/2017 | Nance .................... G01G 19/07 |
| 2017/0370786 | A1 | 12/2017 | Mastrianni et al. |

FOREIGN PATENT DOCUMENTS

| | | |
|---|---|---|
| JP | 1164119 A | 3/1999 |
| WO | 9618866 A1 | 6/1996 |
| WO | 2008110836 A1 | 9/2008 |
| WO | 2013038214 A2 | 3/2013 |

OTHER PUBLICATIONS

International Preliminary Report on Patentability for International Application No. PCT/US2015/067451, dated Jun. 27, 2017 (7 pp.).

Valis, Thomas et al., "Fiber-optic Fabry-Perot stain rosettes", Smart Materials and Structures, IOP Publishing Ltd, Bristol, GB, vol. 1, No. 3 (6 pp.).

Notification of Transmittal of the International Search Report for Interantional Application No. PCT/US15/67451 dated Feb. 19, 2016; dated Mar. 7, 2016; 8 pages.

Written Opinion of the International Searching Authority for International Application No. PCT/US15/67451 dated Feb. 19, 2016; dated Mar. 7, 2016; 6 pages.

* cited by examiner

MEASUREMENT SYSTEM FOR AIRCRAFT, AIRCRAFT HAVING THE SAME, AND METHOD OF MEASURING WEIGHT FOR AIRCRAFT

CROSS-REFERENCE TO RELATED APPLICATIONS

This US non-provisional application claims priority to U.S. Ser. No. 62/312,809, which was filed on Mar. 24, 2016, the contents of which are incorporated herein by reference.

BACKGROUND

Rotary wing aircraft that employ digital fly by wire control systems have a different mode of operation when on the ground versus in flight. The aircraft needs to operate with flight control proportional control authority when in proximity to the ground when one of the wheels touches the landing surface, and in a rate command mode when the wheels are off the ground and the aircraft is flying. It is important for flight controls to be in the correct proportional mode of operation with trim following and pitch roll authority to cope with landing wind conditions particularly on slope landings to prevent control problems if there is an inaccurate sensing of the weight on wheels when landing. Detection of the transition from in air mode to ground mode requires a selected weight on the wheel that has contacted the ground. Detection of a landing condition versus an airborne condition of aircraft has traditionally been accomplished using a weight on wheels ("WOW") switch. In a helicopter application, the WOW switch includes a mechanical micro switch positioned on each landing gear for redundancy. When the aircraft lands and when there is more than a certain amount of weight on the landing gear, the WOW switch triggers to signal that the aircraft flight control system is to be switched to the ground mode. It is difficult to provide a consistent trigger point value using the mechanical switch, since different components on the landing gear, such as shock absorbers, provide variability to the weight on wheels. The mechanical switch provides a discrete on/off result, however an analog value of weight would be more useful to modern digital aircraft. Further, the mechanical switch inherently contains moving parts and often a plastic housing, which are susceptible to malfunction and damage.

The gross weight ("GW") and center of gravity ("CG") are other important aircraft weight-related factors to consider, particularly when determining if the aircraft is safe for take-off. The GW is needed to determine expected fuel consumption and acceptable payload quantities, and for calculating the CG. Ensuring that the CG is within the aircraft's certified CG limits can prevent the aircraft from become unstable during flight, thus avoiding a stall and possible crash from CG issues. Proper aircraft CG location can also be used to reduce fuel consumption as the CG location affects the amount of fuel the aircraft burns. Current vehicle environments determine GW and CG calculations by use of external scales or manual calculations based on a predetermined empty weight and a calculated load from fuel, passengers, and cargo.

As weight related issues for aircraft are important, the art would be receptive to improvements in aircraft weight measurement systems.

BRIEF DESCRIPTION

According to an embodiment, a system for weight measurement for an aircraft having a weight on wheels threshold between a flight mode and a ground mode includes a weight on wheels sensor arrangeable on a landing gear assembly of the aircraft, and a computing device receiving first detected data from the sensor related to strain on the landing gear assembly. The computing device calculates a rate of change of the strain over time to determine when the landing gear assembly reaches the weight on wheels threshold.

In addition to one or more of the features described above, or as an alternative, in further embodiments, a gross weight sensor is arrangeable on the landing gear assembly, the computing device receiving second detected data from the gross weight sensor, and the second detected data separate from the first detected data.

In addition to one or more of the features described above, or as an alternative, in further embodiments, the weight on wheels sensor is a fiber optic sensor tuned to a weight range having an upper weight limit of approximately the weight on wheels threshold.

In addition to one or more of the features described above, or as an alternative, in further embodiments, a gross weight fiber optic sensor is tuned to a weight range having a lower weight limit higher than the upper weight limit of the weight on wheels fiber optic sensor weight range.

In addition to one or more of the features described above, or as an alternative, in further embodiments, the gross weight sensor is tuned to a weight range of approximately empty aircraft gross weight to approximately fully loaded aircraft gross weight.

In addition to one or more of the features described above, or as an alternative, in further embodiments, a temperature sensor is further included in the system.

According to an embodiment, a system for weight measurement of an aircraft having a weight on wheels threshold between a flight mode and a ground mode, the system including a landing gear assembly, and at least one of a weight on wheels sensor and a gross weight sensor arranged on the landing gear assembly to detect weight-related strain, wherein the weight on wheels sensor is tuned to a weight range having an upper weight limit approximately equal to the weight on wheels threshold, and the gross weight sensor is tuned to a weight range having a lower weight limit of approximately empty gross weight of the aircraft.

In addition to one or more of the features described above, or as an alternative, in further embodiments, the system includes both the weight on wheels sensor and the gross weight sensor.

In addition to one or more of the features described above, or as an alternative, in further embodiments, the system includes a computing device, and gross weight measurement using detected data from the gross weight sensor is a static measurement and weight on wheels measurement using detected data from the weight on wheels sensor is a dynamic measurement.

In addition to one or more of the features described above, or as an alternative, in further embodiments, the system includes a computing device receiving first detected data from the weight on wheels sensor and second detected data from the gross weight sensor, the second detected data separate from the first detected data.

In addition to one or more of the features described above, or as an alternative, in further embodiments, at least one of the weight on wheels sensor and the gross weight sensor is a fiber optic sensor.

According to an embodiment, an aircraft having a weight on wheels threshold between a flight mode and a ground mode includes a landing gear assembly and a system for weight measurement. The system includes a weight on wheels sensor arrangeable on the landing gear assembly, and a computing device receiving first detected data from the sensor related to strain on the landing gear assembly. The computing device calculates a rate of change of the strain over time to determine when the landing gear assembly reaches the weight on wheels threshold.

In addition to one or more of the features described above, or as an alternative, in further embodiments, the aircraft includes a gross weight sensor on the landing gear assembly, the computing device receiving second detected data from the gross weight sensor, the second detected data separate from the first detected data.

In addition to one or more of the features described above, or as an alternative, in further embodiments, the sensor is a fiber optic sensor tuned to a weight range having an upper limit approximately equal to the weight on wheels threshold.

A method of measuring weight for aircraft having a weight on wheels threshold between a flight mode and a ground mode includes arranging a weight on wheels sensor on a landing gear assembly of the aircraft; sending first detected data from the sensor to a computing device, the first detected data related to strain on the landing gear assembly; and, computing, by the computing device, a rate of change of the strain over time to determine when the landing gear assembly reaches the weight on wheels threshold.

In addition to one or more of the features described above, or as an alternative, in further embodiments, prior to arranging the weight on wheels sensor on the landing gear assembly of the aircraft, the method includes selecting a fiber optic sensor tuned to a weight range having an upper limit less than an initial compression weight of a shock absorber in the landing gear assembly.

In addition to one or more of the features described above, or as an alternative, in further embodiments, the method includes filtering out vibrations of the aircraft with a band pass filter.

In addition to one or more of the features described above, or as an alternative, in further embodiments, the method includes arranging a gross weight sensor on the landing gear assembly, sending second detected data from the gross weight sensor to the computing device, and computing, by the computing device, a gross weight of the aircraft using the second detected data.

In addition to one or more of the features described above, or as an alternative, in further embodiments, prior to arranging the gross weight sensor on the landing gear assembly of the aircraft, the method includes selecting a fiber optic sensor tuned to a weight range between approximately an empty gross weight of the aircraft and approximately a fully loaded gross weight of the aircraft.

In addition to one or more of the features described above, or as an alternative, in further embodiments, the method includes computing, by the computing device and the second detected data, a center of gravity of the aircraft.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Figure 1:
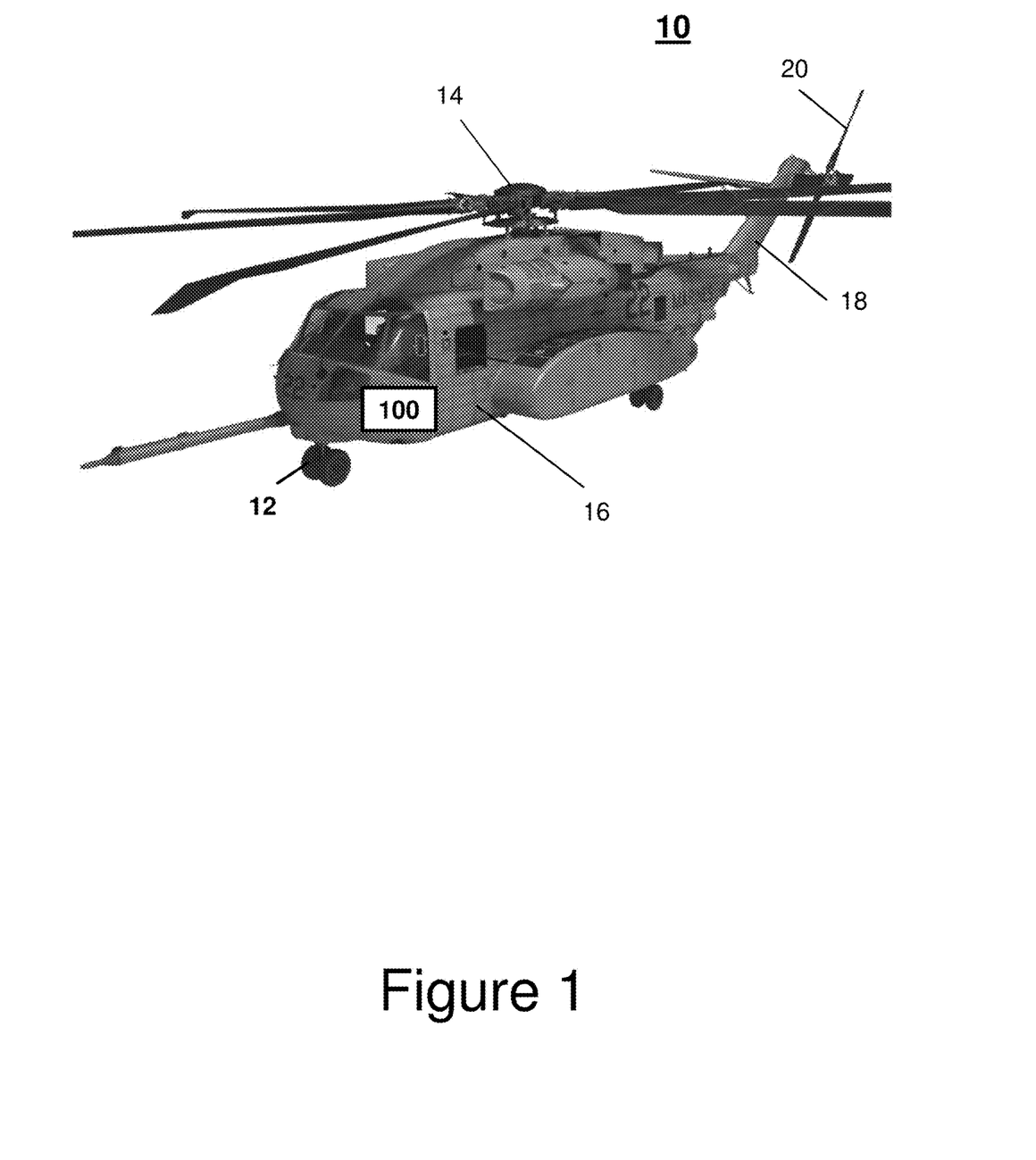
FIG. 1 depicts one embodiment of an aircraft equipped with one embodiment of a weight measurement system.

FIG. 1 illustrates a vehicle environment (e.g., a rotary wing aircraft 10) having a main rotor system 14. The aircraft 10 includes an airframe 16 having an extending tail 18, which mounts a tail rotor system 20, such as an anti-torque system. The main rotor assembly 14 is driven through a main power transmission gearbox by one or more engines. The aircraft 10 employs at least one landing gear assembly 12 during a landing procedure and while performing land-based maneuvers on a ground surface. The aircraft 10 further incorporates a measurement system 100 for performing a measuring process of the strain on the landing assembly 12. In an embodiment where the aircraft 10 is a fly by wire aircraft, the measurement system 100 provides accurate, repeatable values of weight that enable use of an accurate weight on wheels ("WOW") measurement, gross weight ("GW") measurement, and calculation of center of gravity ("CG") for modern digital aircraft. The system 100 can also be used as a back-up for a mechanical weight sensor. By providing a GW measurement, the system 100 eliminates the need for a pilot to calculate GW based on payload and manually enter the GW measurement since the GW measurement from the system 100 can be fed directly into a flight control computer. Improving accuracy of the WOW measurement is also enabled using the system 100.

Although a particular rotary wing aircraft 10 configuration is illustrated and described in the disclosed embodiment, other vehicle environments, configurations, and/or machines, such as ground vehicles, jet aircraft, high speed compound rotary wing aircraft with supplemental translational thrust systems, dual contra-rotating, coaxial rotor system aircraft, turbo-props, fixed wing aircraft, tilt-rotors and tilt-wing aircraft, and the like may also benefit from the embodiments described herein.

The landing gear assembly 12 may transition between various conditions, including what is referred to herein as an extended condition and a compressed condition. The extreme extended and compressed conditions will vary depending on the particular application and upon the forces applied to the landing gear assembly 12.

The measurement system 100, which can be integral to the aircraft 10 or retrofitted to the aircraft 10, reliably and automatically measures and may additionally display at least one of a weight on wheels ("WOW") measurement and a gross weight and center of gravity ("GW/CG") measurement via software algorithm. The measurement system 100 includes a sensor sub-system that includes one or more strain sensors for the WOW measurement and one or more strain sensors for the GW/CG measurement. When more than one strain sensor is employed on each landing gear assembly 12 for the WOW measurement, the plurality of strain sensors may be arranged in different orientations from each other so that different directional forces may be detected and output. Likewise, when more than one strain sensor is employed on each landing gear assembly 12 for the GW/CG measurement, the plurality of strain sensors may be arranged in different orientations from each other so that different directional forces may be detected and output. The outputs of the strain sensors are further received and processed by a computing device of the measurement system 100, which is in communication with the sensor sub-system that utilizes one or more algorithms to solve for mechanical strain on the landing gear assembly 12.

Figure 2:
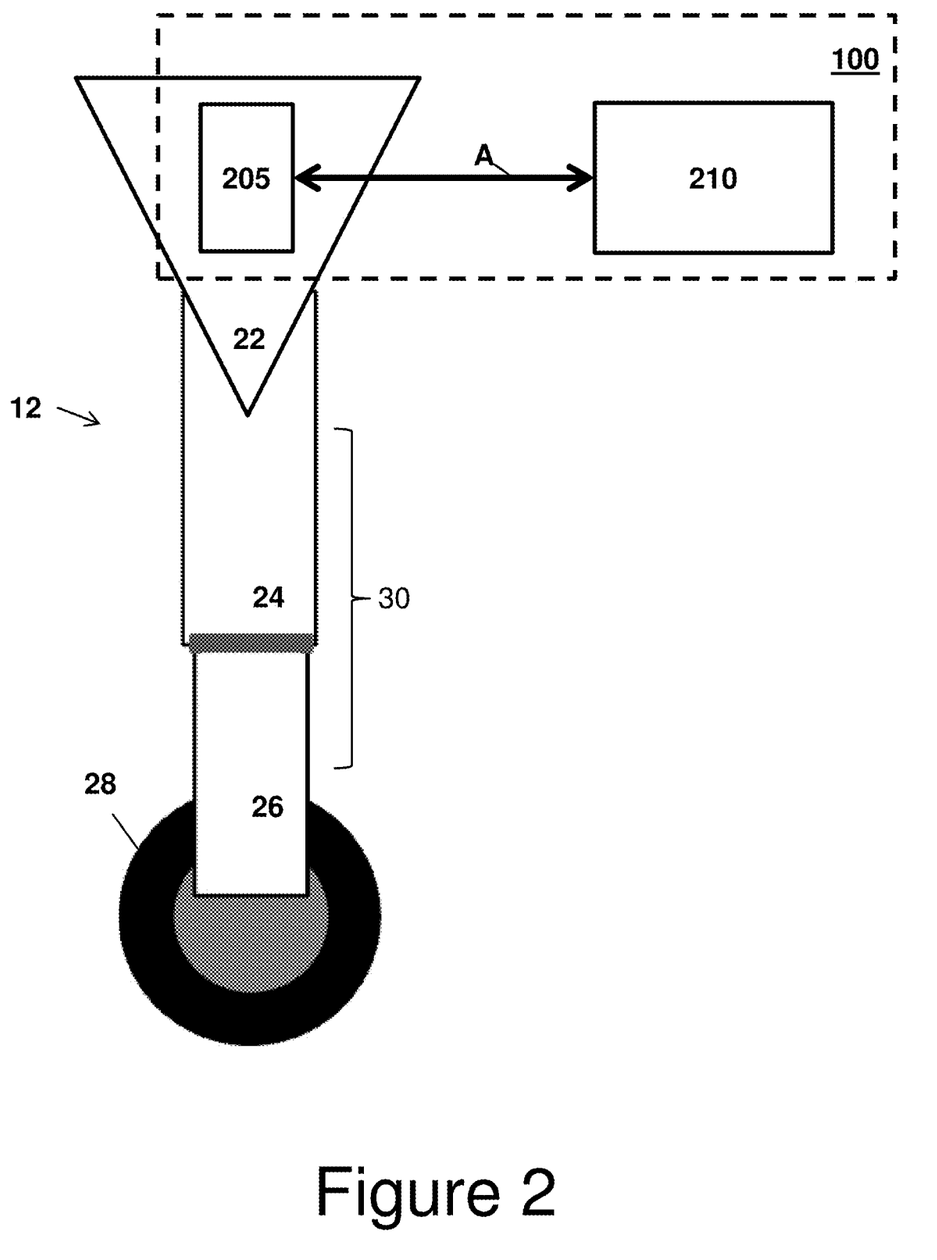
FIG. 2 schematically depicts the weight measurement system of FIG. 1 on one embodiment of a landing gear assembly; and, FIG. 3 schematically depicts an embodiment of the weight measurement system.
Figure 3:
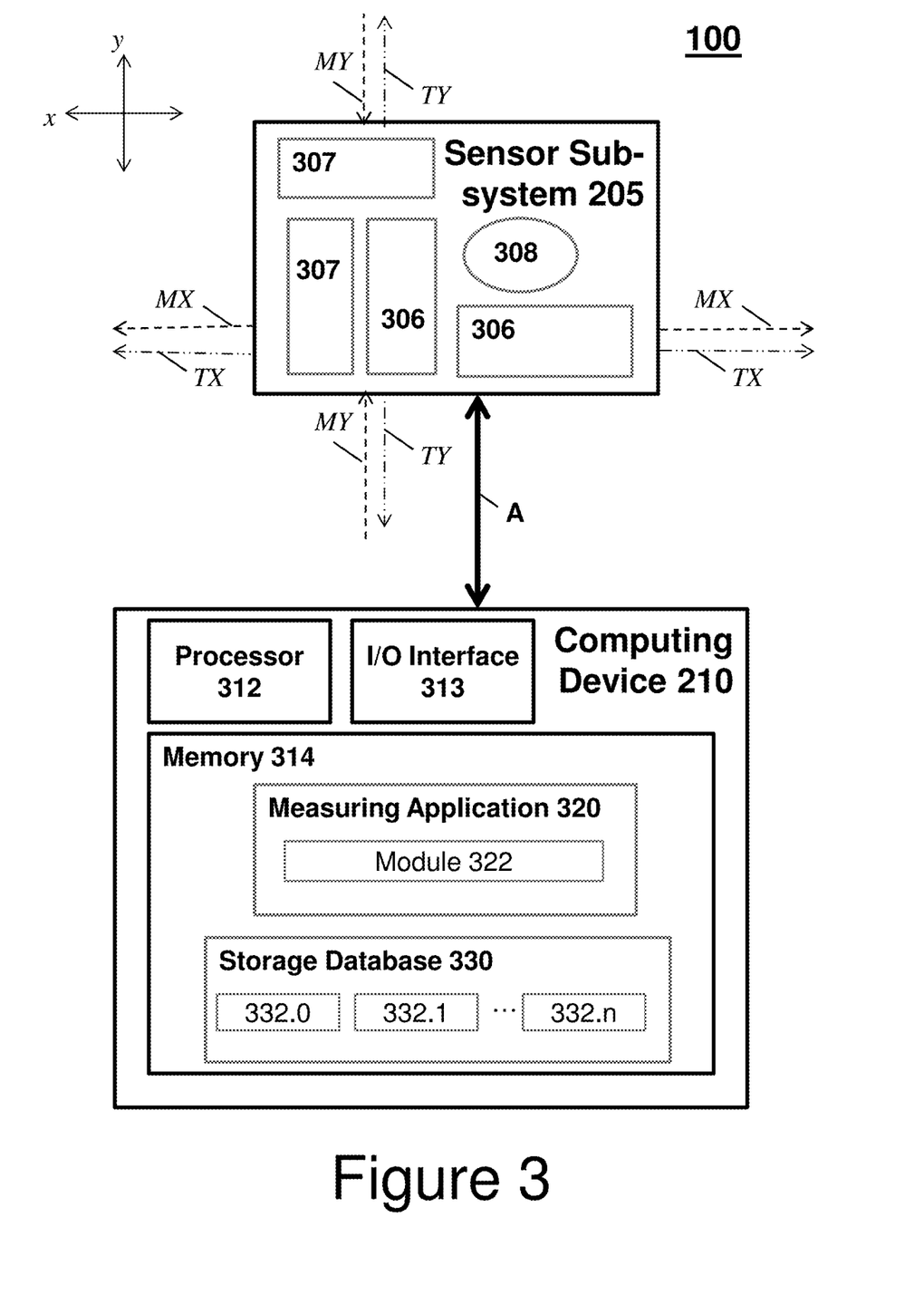

The vehicle environment and elements therein of FIGS. 1-3 may take many different forms and include multiple and/or alternate components and facilities. That is, while a rotary-wing aircraft 10 is shown in FIG. 1, the components illustrated in FIGS. 1-3 are not intended to be limiting. Indeed, additional or alternative components and/or implementations may be used. The landing gear assembly 12 and the measurement system 100 are schematically illustrated in greater detail with respect to FIG. 2.

In one embodiment, the landing gear assembly 12 includes a trunnion 22 and a cylinder 24 that is directly or indirectly coupled to the aircraft 10. The trunnion 22 is a protrusion from the landing gear assembly 12 utilized as a mounting and/or pivoting point for the cylinder 24. The cylinder 24 has an outer cylinder surface, which the trunnion 22 is coupled to, and an inner cylinder surface, with the inner cylinder surface defining an interior chamber of the cylinder 24. Although referenced as a cylinder 24 herein, it can be appreciated that alternate shapes and geometric configurations may be employed, as long as the interior chamber is present. A piston 26 is directly or indirectly coupled to a wheel 28 of the landing gear assembly 12 and is configured to translate relative to the cylinder 24 upon the application of a force to the wheel 28. Specifically, the piston 26 is in sliding disposition with the cylinder 24 such that a portion of the piston 26 telescopes within the interior chamber of the cylinder 24. The piston 26 and cylinder 24 together form a shock absorber 30, also known as an oleo, for the landing gear assembly 12.

When the aircraft 10 is coming in for a landing, it is important to know when the aircraft 10 is on the ground. As the wheel 28 of each landing gear assembly 12 hits the surface, some strain on the landing gear assembly 12 will begin to be detected by the sensor sub-system 205. The aircraft 10 has a WOW transition point where the WOW will be an indication that the aircraft 10 is on the ground. For example, the WOW transition point for a 25,000 pound aircraft may be approximately 800 to approximately 1,000 pounds on the main landing gear meaning that once that weight has been detected as being applied to the wheel 28 of a landing gear assembly 12 (as calculated using the rate of change as will be further described below), the aircraft 10 is on the ground. It should be understood that the actual WOW transition point could be different for different types of aircraft 10.

Prior to or after flight it is also advantageous to acquire GW/CG by the measurement system 100 of the aircraft 10, such as monitoring the strains on the trunnion 22. The data obtained by the measurement system 100 during monitoring of the strains on the trunnion 22 may also provide diagnostic information about various components of the landing gear assembly 12, such as shocks and struts that are employed on the landing gear assembly 12 to dampen forces associated with a landing of the aircraft 10, thereby reducing oscillations caused by such forces.

The measurement system 100, as represented by the dashed-box in FIG. 2, includes the sensor sub-system 205 and the computing device 210 that are communicatively coupled, as represented by Arrow A, and that are incorporated with or external to each other. The measurement system 100, the sensor sub-system 205, and the computing device 210 may include and/or employ any number and combination of sensors, computing devices, and networks utilizing various communication technologies, as described below, that enable the measurement system 100 to perform the measuring process.

With reference to FIG. 3, the sensor sub-system 205 includes at least one sensor 306 optimized for a WOW measurement, and at least one sensor 307 optimized for a GW/CG measurement. In the embodiment shown in FIG. 3, there are two WOW sensors 306 and two GW/CG sensors 307 schematically depicted, however any number of sensors 306, 307, including one of each, may be incorporated in the sensor sub-system 205. In one embodiment including more than one WOW sensor 306, two WOW sensors may be positioned perpendicular to each other. That is, a first WOW sensor 306 may be placed along first direction (x) while a second WOW sensor is placed along a second direction (y) that is perpendicular to the first direction. Likewise, a first GW/CG sensor 307 may be placed along first direction (x) while a second GW/CG sensor 307 is placed along a second direction (y) that is perpendicular to the first direction. The sensors 306, 307 are bonded such that mechanical expansion along the 'x' axis will cause a contraction along 'y' (and vice versa), with the ratio of the expansion to contraction equal to the Poisson Ratio (e.g., ~0.33 for Aluminum). The sensors 306, 307 are operatively coupled to the landing gear assembly 12 (e.g., the trunnion 22), although the location of the sensors 306, 307 may be altered depending on the aircraft 10. The sensor sub-system 205 may further include at least one temperature sensor 308 in addition to the sensors 306, 307. The precise location of each sensor 306, 307, 308 may vary. In one embodiment, the sensors 306, 307, 308 are operatively coupled to the trunnion 22 proximate the cylinder 24. Further, the sensors 306 and 307 may be placed adjacently depending on the configuration of the landing gear assembly 12. In a fixed landing gear assembly 12, the sensors 306, 307, 308 may be located on the axle, the top of the landing gear assembly 12, and other locations. The placement of the sensors 306, 307 may be determined by taking a strain map of the landing gear assembly 12, and locating the sensors 306, 307 in an area of the landing gear assembly 12 exhibiting maximum strain during a landing.

The sensors 306, 307, 308 are converters that measure physical quantities and convert these physical quantities into a signal that is read by the computing device 210. The sensors 306, 307 are fiber optic strain gauges that measure the physical stress applied to the landing gear assembly 12. The fiber optic strain gauges are capable of accurately determining microstrain on a piece of metal (on the landing gear assembly 12). The fiber optic sensors utilize a laser beam and measures, using a grating on the fiber optic strand of the fiber optic sensor, the return frequency, and the frequency relates to the microstrain. Fiber optic sensors 306, 307 are bonded to the landing gear assembly 12. The landing gear assembly 12, although formed from solid components, will expand and contract with temperature and will contract when force is applied as well, and the fiber optic sensors 306, 307 can thus detect the strain on the landing gear assembly 12.

The temperature sensor 308 measures the temperature characteristics and/or the physical change in temperature of the landing gear assembly 12. The temperature sensor 308 may include fiber optic nano temperature sensor, heat meter, infrared thermometer, liquid crystal thermometer, resistance thermometer, temperature strip, thermistor, thermocouple, and the like. In any of the embodiments, the sensors 306, 307, 308 may be individually or collectively located within a housing to provide protection for the sensors 306, 307, 308 from materials that may cause structural damage to the sensors 306, 307, 308 (e.g., or that may occlude the optical capabilities of the sensors 306, 307). Furthermore, the sensors 306, 307 and/or the temperature sensor 308 may be located in a circumferentially spaced manner around the trunnion 22, the cylinder 24, or within the interior chamber of the cylinder 24 or elsewhere on the landing gear assembly 12.

Fiber optic sensors can advantageously be tuned to within particular ranges. Thus, for improving the accuracy of WOW and GW/CG measurements and calculations, separate fiber optic sensors 306, 307 that are each individually optimized for their particular expected weight ranges are provided in the measuring system 100 instead of a single sensor for both types of measurements. The deflection of the shock absorber 30 affects the accuracy measurements of fiber optic strain sensors in the substantially non-linear range of deflection of the shock absorber 30 with respect to change in load on the landing gear assembly 12. The deflection of the shock absorber 30 is the stroke distance that the piston 26 moves with respect to the cylinder 24. In one embodiment, a curve of the stroke distance of the shock absorber 30 to load on the landing gear assembly 12 may include a first portion that is substantially linear with a shallow positive slope (at initial compression of the shock absorber 30), a second portion that is substantially non-linear with an increasing slope, and a third portion that is substantially linear with a steep slope (as the shock absorber 30 approaches full compression). Most inaccuracies in weight detection by fiber optic sensors occur in the substantially non-linear portion of the relationship between stroke distance and load, and the fiber optic sensors 306, 307 are advantageously tuned to ranges respectively outside of the weight range where the second portion of the curve is substantially non-linear. As previously described, the WOW trigger point or threshold is the weight at which it can be said a particular aircraft has landed from a flight mode, or has taken flight from a ground mode. As an example, the WOW trigger point may be 1,000 pounds, meaning that a flight computer would look for a 1,000 pound weight difference on the landing gear assembly 12 to make a mode transition from flight to ground or ground to flight. The WOW trigger point is less than the lower weight limit in the range of substantially non-linear oleo deflection to load change, and the WOW fiber optic sensor 306 is tuned to weights below the lower weight limit in the range of substantially non-linear oleo deflection to load change (and may further be lower than the lower weight limit of initial oleo compression), for providing more accurate readings for WOW. Further, because any weight higher than the WOW threshold is of no value for WOW detection, the fiber optic sensor 306 may be tuned to a weight range between 0 and the WOW threshold. Also, because GW measurements per landing gear may be near the upper weight limit of oleo deflection (the third portion of the stroke distance to load curve), the GW/CG fiber optic sensor 307 is tuned to weights in a more linear range of oleo deflection to load, for providing more accurate readings for GW and CG calculations. Measurements within the substantially non-linear oleo deflection range are not useful for either WOW or GW/CG calculations, and therefore the fiber optic sensors 306, 307 are individually optimized outside of the substantially non-linear oleo deflection to load range, thus negating the inaccuracies that would occur using a single fiber optic sensor for both weight measurements. In addition to using separate sensors 306, 307 for WOW and GW/CG measurements, the sensors 306, 307 use different types of fiber optic sensors that are tuned to their respective intended weight measurements (loads). For example, a first weight range may be defined that includes at least the substantially non-linear portion of the stroke to load curve. More particularly, the first weight range may include the entire weight range that is valueless for the purposes of WOW and GW/CG measurements. For example, anything greater than the WOW weight transition point and less than an aircraft empty GW is of no concern to either the WOW or GW/CG measurements. The sensors 306 may be tuned to a second weight range that is lower than the lower limit of the first weight range, such as between 0 to approximately the WOW threshold. The second weight range includes the WOW threshold of the aircraft 10 that the weight measurement system 100 is to be employed. Also, the sensors 307 may be tuned to a third weight range beginning at an aircraft empty GW which is less affected by the non-linear relationship between compression of the shock absorber 30 and load.

During take-off, GW measurement from the 307 sensors is used as the initial value, and the decremented change from this initial value to 1,000 pounds on the WOW fiber optic sensor 306 is used (GW−1,000=Change needed to trigger WOW). The WOW fiber optic sensor 306 looks for a change over a finite time period. Fast changes, such as those caused by aircraft vibrations or turbulence would be filtered out by the measurement system 100.

Thus, the sensor subsystem 205 incorporates at least two different fiber optic strain gages. WOW sensor 306 is optimized for a second weight range, such as, but not limited to, a 0-1,000 pound weight range, for WOW trigger point detection, and the GW/CG sensor 307 is optimized for a third weight range, such as, but not limited to empty GW to fully loaded GW range for GW/CG measurements. In the example provided, the measurements for the WOW sensor 306 and GW/CG sensor 307 disregard detection above the WOW trigger point (e.g. 1,000 pounds) but below empty GW, and thus the sensors 306, 307 avoid inaccurate readings due to oleo compression contributions that occur within the first range. Further, having the fiber optic sensor 306 tuned to the second weight range (e.g., 0-1,000 pound range) is more accurate than detecting a 1,000 pound WOW transition utilizing a fiber optic sensor that is tuned to 10,000 pounds, or to 100.000 pounds full scale ("FS"), for example.

Decoupling the WOW measurements from the GW/CG measurements and calculations additionally enable a method of providing more accurate measurements by accounting for the WOW measurements being dynamic and the GW/CG measurements being taken in a static environment. During take-off, when the aircraft 10 is initially on the ground, the weight on each wheel reduces from full landing gear weight, e.g. 8000 pounds, to 0 pounds in a relatively short period of time, such as less than a minute. Likewise, when the aircraft 10 lands, the weight on each wheel increases from 0 pounds to full landing gear weight. e.g. 8000 pounds in a short period of time, such as less than a minute, and therefore measuring WOW is time dependent. The WOW measurement requires looking at the range at the WOW transition point and below, such as between 0 and 1000 pounds, so the WOW sensor 306 includes a fiber that is tuned in that second weight range. Also, since the WOW measurement is time dependent (dynamic), the WOW measurement is different in weight over time. To deal with this dynamic measurement, the computing device 210 computes the first derivative (slope of the line) of the data provided by the WOW sensor 306, to find the rate of change rather than just a weight measurement. This procedure eliminates data attributable to turbulence that could otherwise cause a false reading of a WOW transition point. For example, while in flight, turbulence could cause the WOW reading to go immediately from 0 to 4,000 pounds, but the computing device 210 will not compute the turbulence as a WOW transition point indicative of a landing because the rate of change of the WOW reading does not progress along a line during turbulence as it does in a landing. In a landing, the landing gear assembly 12 detects strain on it from 0 pounds and then the strain increases up to 1,000 pounds over a range of time, even in a hard landing. The computing device 210 can be programmed to recognize if the change is valid (within the range of normal flight parameters indicate of a take-off or landing) or if the change is the result of turbulence by looking at the first derivative and eliminating the changes that are not due to landing (or take-off). For the dynamic measurements, two filtering algorithms may be incorporated. A first algorithm can utilize a band pass filter to minimize periodic vibratory components of the detected data from the WOW sensor 206, and a second algorithm would use a first derivative measurement of slope to determine the rate of change rather than relying on a specific weight measurement which could be falsely triggered in air during turbulence, and may further filter out thermal drift of the fiber optic sensor by zeroing out the thermal measurement, as described below.

Unlike the WOW measurement, the GW is a static measurement. When the aircraft 10 lands, it may not land on all wheels 28 at once. For example, the aircraft 10 may first land on the right wheel 28, then the left wheel 28, then nose wheel 28. Thus, during landing, detected data from the GW/CG sensor 307 is changing. Even after a full landing, the aircraft 10 may bounce up and down and the detected data from the GW/CG sensor 307 may further change due to spinning rotors in a rotary wing aircraft such that an actual GW measurement may not be accurate until the aircraft 10 is stationary. Thus, for the GW measurement, the computing device 210 takes a static reading between the aircraft empty weight (e.g. 8,000 pounds on each wheel 28) and fully loaded aircraft weight (e.g. 10,000 pounds on each wheel 28) and adds up the weight on each wheel to provide the GW of the aircraft 10. The fiber in the GW/CG sensor is tuned for measuring accurately within the expected third weight range (empty and loaded) on each wheel 28 for a particular aircraft. By tuning the sensor 307 to the third range, substantially all of the deleterious effects of the non-linear relationship between compression of the shock absorber 30 and load change is at least substantially avoided. Knowing the GW, the CG area can be calculated using the geometry of the aircraft 10, including how far apart the wheels 28 are from each other. Additionally, as with the detected data from the WOW sensor 306, the computing device 210 may use an algorithm to filter out any strain caused by thermal drift. The GW/CG calculations may be graphically displayed on a multi function display (not shown).

The fiber optic sensors 306, 307 detect the manifestation of a total strain on the aircraft 10 by measuring a shift in wavelength of reflected light. In one embodiment, the contribution from mechanical strain and thermal strains are isolated by the computing device 210 so that a measurement for a strict mechanical load is used to measure the WOW and GW/CG. In such an embodiment, the computing device 210 may utilize a measurement algorithm to isolate the differences in the physical properties of mechanical and thermal strains in two directions from the total strain on the aircraft detected by the sensors 306, 307. Mechanical strain is a vector force and causes compression (MY) in the landing gear in the direction of the force. Further, in a perpendicular direction to the force (MX), mechanical strain will cause expansion of the material in proportion to Poisson's Ratio. Thermal load causes strain proportionally to the coefficient of thermal expansion to be spread in all directions (TX, TY). Utilizing the directional distinctions, the measurement algorithm can solve simultaneously two separate equations, one for mechanical strains and one for thermal strains, to decouple from the total strain an isolated mechanical strain. Thermally induced strain, on the other hand, affects the sensors 306, 307 similarly (i.e. expansion or contraction in both directions).

The sensors 306, 307, 308 are configured to relay detected data to the computing device 210. The computing device 210 is schematically depicted and the location of the computing device 210 may vary. In some embodiments, the computing device 210 may be integrated within the sensor sub-system 205. Alternatively, the computing device 210 may be disposed at a remote location in a wired or wireless communicative state with the sensor sub-system 205. The computing device 210 may include a processor 312, input/output (I/O) interface 313, and a memory 314. The memory 314 may further store a measuring application 320, which includes a module 322, and/or a storage database 330, which includes data 332.

The computing device 210 is configured to provide a measuring process, where the processor 312 may receive computer readable program instructions from the measuring application 320 of the memory 314 and execute these instructions, thereby performing one or more processes defined by the measuring application 320. Also, the computing device 210 may utilize the storage database 330 to archive and store detected data received from the sensor sub-system 205 and/or data computed by the measuring application 320, as data 332.

The processor 312 may include any processing hardware, software, or combination of hardware and software utilized by the computing device 210 that carries out the computer readable program instructions by performing arithmetical, logical, and/or input/output operations. Examples of the processor 312 include, but are not limited to an arithmetic logic unit, which performs arithmetic and logical operations; a control unit, which extracts, decodes, and executes instructions from a memory; and an array unit, which utilizes multiple parallel computing elements.

The I/O interface 313 may include a physical and/or virtual mechanism utilized by the computing device 210 to communicate between elements internal and/or external to the computing device 210. That is, the I/O interface 313 may be configured to receive or send signals or data within or for the computing device 210. An example of the I/O interface 313 may include a network adapter card or network interface configured to receive computer readable program instructions from a network and forward the computer readable program instructions, original records, or the like for storage in a computer readable storage medium (e.g., memory 314) within the respective computing/processing device (e.g., computing device 210).

The memory 314 may include a tangible device that retains and stores computer readable program instructions, as provided by the measuring application 320, for use by the processor 312 of the computing device 210.

The measuring application 320 ("application 320") includes computer readable program instructions configured to receive and respond to detected data from the sensor sub-system 205 and/or user inputs instructing the application 320 to operate in a particular manner. The application 320 includes and is configured to utilize a module 322 to perform measurement and algorithms during take-off, landing, and stationary modes and other situations of the aircraft 10. The module 322 comprises computer readable program instructions configured, in part, to find the first derivative of detected data from the WOW sensor 306, filter the detected data from the WOW sensor 306 using a band pass filter, eliminate from the detected data from the sensors 306, 307 the effects of strain caused by temperature, and calculate the GW and CG using the detected data from the GW/CG sensor 307.

While single items are illustrated for the application 320 (and other items by each Figure), these representations are not intended to be limiting and thus, the application 320 items may represent a plurality of applications. For example, multiple measuring applications in different locations may be utilized to access the collected information, and in turn those same applications may be used for on-demand data retrieval. In addition, although one modular breakdown of the application 320 is offered, it should be understood that the same operability may be provided using fewer, greater, or differently named modules. Although it is not specifically illustrated in the figures, the applications may further include a user interface module and an application programmable interface module; however, these modules may be integrated with any of the above named modules. A user interface module may include computer readable program instructions configured to generate and mange user interfaces that receive inputs and present outputs. An application programmable interface module may include computer readable program instructions configured to specify how other modules, applications, devices, and systems interact with each other.

The storage database 330 may include a database, such as the described above data repository or other data store and may include various kinds of mechanisms for storing, accessing, and retrieving various kinds of data, including a hierarchical database, a set of files in a file system, an application database in a proprietary format, a relational database management system (RDBMS), etc., capable of storing data 332. The storage database 330 is in communication with the application 320 of and/or applications external to the computing device 310, such that information, data structures, and documents including data 332 may be collected and archived in support of the processes described herein (e.g., mapping process). As illustrated in FIG. 3, the storage database 330 includes the data 332, illustrated as data 322.0 to data structure 332.*n*, where 'n' is an integer representing a number of structures archived by the storage database 330. Although one exemplary numbering sequence for the data 332 of the storage database 330 is offered, it should be understood that the same operability may be provided using fewer, greater, or differently implemented sequences. The storage database 330 may generally be included within the computing device 210 employing a computer operating system such as one of those mentioned above. The storage facility 330 may also run independently of the computing device 210 and in communication with the application 320 and the sensor sub-system 205 via a network in any one or more of a variety of manners. In operation, for example, the storage database 330 may collect and archive the data 332 received from the application 320 and the sensor sub-system 205. The storage database 330 may further communicate with other systems that may be internal or external to the measuring system 100 to collect and archive data 332. The information may be any collection of data stored in a data structure. A data structure (e.g., the individual instances of the data 332) is a mechanism of electronically storing and organizing information and/or managing large amounts of information. Thus, the data 332 are illustrative of sensor outputs, calculation outputs, and historical information that are stored for use by the application 320. Examples of data structure types include, but are not limited to, arrays, which store a number of elements in a specific order; records, which are values that contains other values; hash tables, which are dictionaries in which name-value pairs can be added and deleted; sets, which are abstract data structures that store specific values without any particular order and repeated values; graphs and trees, which are linked abstract data structures composed of nodes, where each node contains a value and also one or more pointers to other nodes; and objects, which contain data fields and program code fragments for accessing or modifying those fields.

In an algorithm addressing the thermal components of strain, the application 320 receives a plurality of first inputs indicating a first physical state of the aircraft 10. The plurality of first inputs corresponds to output signals from the sensors 306, 307, 308 of the sensor sub-system 205. The application 320 calculates a first gross weight, a first center of gravity, and the weight on wheels based on the plurality of inputs. The application 320 receives a plurality of second inputs indicating a second physical state that is subsequent to a change in temperature and altitude. GW and CG are read and calculated when the aircraft is on the ground, however temperature may affect this reading as the aircraft is coming down from altitude and temperature stabilizes at ground level, thus the mechanical and thermal components may be identified to improve readings. The plurality of second inputs also corresponds to output signals from the sensors 306, 307, 308 of the sensor sub-system 205. The application 320 decouples the plurality of second inputs into temperature and mechanical strain components utilizing the algorithm of the module 322. The application 320 calculates a second gross weight, a second center of gravity, and a second weight on wheels based on the mechanical strain components. Then, the application 320 may output notifications based on the second gross weight, second center of gravity, and second weight on wheels. The notifications, in general, are identifying information (or non-existence of the information) targeted to the systems or users responsible for the aircraft 10. Examples of notifications may include, but are not limited to, any combination of audio alerts (e.g., buzzers, bells, tones, telephone calls, cellphone calls, VoIP calls, voicemails, loudspeaker announcements, etc.), visual displays (e.g., flashing lights, display pop-ups), pager, electronic mail, desktop alerts, instant messaging, text messaging, and the like.

In view of the above, the systems, sub-systems, and/or computing devices, such as measuring system 100, including sensor sub-system 205 and computing device 210, may employ any of a number of computer operating systems. Examples of computing devices include, without limitation, a computer workstation, a server, a desktop, a notebook, a laptop, a network device, a handheld computer, or some other computing system and/or device. Computing devices may include a processor (e.g., a processor 312 of FIG. 3) and a computer readable storage medium (e.g., a memory 314 of FIG. 3), where the processor receives computer readable program instructions, e.g., from the computer readable storage medium, and executes these instructions, thereby performing one or more processes, including one or more of the processes described herein (e.g., measuring process).

Computer readable program instructions may be compiled or interpreted from computer programs created using assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on a computing device, partly on the computing device, as a stand-alone software package, partly on a local computing device and partly on a remote computer device or entirely on the remote computer device. In the latter scenario, the remote computer may be connected to the local computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Computer readable program instructions described herein may also be downloaded to respective computing/processing devices from a computer readable storage medium or to an external computer or external storage device via a network (e.g., any combination of computing devices and connections that support communication). For example, a network may be the Internet, a local area network, a wide area network and/or a wireless network, comprise copper transmission cables, optical transmission fibers, wireless transmission, routers, firewalls, switches, gateway computers and/or edge servers, and utilize a plurality of communication technologies, such as radio technologies, cellular technologies, etc.

Computer readable storage mediums may be a tangible device that retains and stores instructions for use by an instruction execution device (e.g., a computing device as described above). A computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Thus, a measuring system and method and/or elements thereof may be implemented as computer readable program instructions on one or more computing devices, stored on computer readable storage medium associated therewith. A computer program product may comprise such computer readable program instructions stored on computer readable storage medium for carrying and/or causing a processor to carry out the operations of measuring system and method.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the operations/acts for the method. These computer readable program instructions may also be stored in a computer readable storage medium that can direct a computer, a programmable data processing apparatus, and/or other devices to operate in a particular manner, such that the computer readable storage medium having instructions stored therein comprises an article of manufacture including instructions which implement aspects of the operation/act for the method.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the method.

Thus, a first weight range may be defined between approximately a WOW transition point (or just greater than a WOW transition point) and approximately an empty aircraft GW. A second weight range may be from 0 pounds to the WOW threshold, where a dynamic signal as the aircraft takes off or lands provides the signal to switch between ground/flight mode, for example, around 1,000 pounds. The second weight range is substantially outside of the first weight range, with an upper limit of the second weight range being generally lower than a lower limit of the first weight range. Also, the second weight range, in which the first fiber optic sensor 306 is tuned, is outside of any non-linear relationship between shock absorber compression and load weight change. A third weight range is the GW range, between empty GW and full GW of the aircraft. This is where a static measurement is taken of the aircraft weight. Although the shock absorber 30 may still be compressing as weight is added to the aircraft 10 above the empty GW, this occurs at a substantially linear relationship between shock absorber compression and load change, thus the weight range where the relationship between shock absorber compression to load weight change is substantially non-linear is avoided by both the second and third weight ranges. The GW/CG weight sensor 307 is tuned to the third weight range.

The measurement system 100 advantageously avoids detected data within the non-linear shock absorber compression range, included in the first weight range. Thus, both WOW and GW/CG measurements are measured more accurately. Also, the computing device 210 calculates the WOW dynamic measurement, by taking the first derivative of the measured valves, the rate of change, to prevent a false reading, as an actual take-off or landing will have a slower rate of change in detected data than vibrations and turbulence. Thus, it is the combination of WOW and rate of change that is used by the computing device 210 to trigger an indication that the WOW transition point has been reached. This indication is used by flight controls to control the aircraft 10 accordingly.

Since fiber optics can be tuned for accuracy within different ranges, a fiber that is tuned to a range of 0-1,000 pounds will be more accurate than one tuned to a 0-10,000 pound range. Thus, the WOW measurement is more accurate due to fiber tuning, in addition to the rate of change calculation and the removal of shock absorber measurements. Assuming that WOW is dynamic and applying algorithms to reduce variability from vibration and temperature results in a more stable signal. The WOW and GW/CG are used by different avionics systems so using different sensors 306, 307 advantageously decouples the sensor signals. There is no increase in fiber sensor interrogator weight, since an interrogator can read multiple sensors. Additional sensor weight is negligible.

Thus, improvements in determining when the aircraft 10 reaches the WOW transition point (WOW threshold) and measuring the weight (GW) of the aircraft 10 are made possible by the measurement system 100. The system 100 is further useful on aircraft 10 to be landed on a pitching and rolling deck of a ship or on a sloped ground, where one wheel 28 may touch before the others, so that not all three wheels 28 land at the same time. Having an accurate WOW sensor 306 on each landing gear assembly 12, as well as an effective measuring system 100 for correctly identifying the WOW of the aircraft 10 provides flight control with the information necessary to transition to the ground mode (or flight mode) when the WOW transition point is reached, as determined by the rate of change.

While the system 100 has been described as incorporated within the landing gear assembly 12 of aircraft 10, the system 100 could also be manufactured and sold separately for retrofitting to existing fixed wing and rotary wing aircraft.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. Further, it should be noted that the terms "first," "second," and the like herein do not denote any order, quantity or importance, but rather are used to distinguish one element from another. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A system for weight measurement for an aircraft, the aircraft having a weight on wheels threshold between a flight mode and a ground mode, the aircraft system comprising:
    at least two weight on wheels sensors arrangeable on a landing gear assembly of the aircraft, the at least two weight on wheels sensors comprising a first fiber optic sensor mounted in a first orientation and a second fiber optic sensor mounted in a second orientation that us substantially perpendicular to the first orientation, the at least two weight on wheels sensors being tuned to a weight range having an upper weight limit of approximately the weight on wheels threshold;
    a gross weight fiber optic sensor tuned to a weight range having a lower weight limit higher than the upper weight limit of the weight on wheels fiber optic sensor weight range; and,
    a computing device receiving first detected data from the sensor related to strain on the landing gear assembly, the computing device calculating a rate of change of the strain over time to determine when the landing gear assembly reaches the weight on wheels threshold.

2. The system of claim 1, wherein the gross weight sensor is tuned to a weight range of approximately empty aircraft gross weight to approximately fully loaded aircraft gross weight.

3. The system of claim 1, further comprising a temperature sensor.

4. A system for weight measurement of an aircraft having a weight on wheels threshold between a flight mode and a ground mode, the system comprising:
    a landing gear assembly; and,
    at least two weight on wheels sensors mounted to the landing gear assembly, the at least two weight on wheels sensors comprising a first fiber optic sensor mounted in a first orientation and a second fiber optic sensor mounted in a second orientation that us substantially perpendicular to the first orientation; and
    a gross weight fiber optic sensor arranged on the landing gear assembly the at least two weight on wheels sensors and the gross weight sensor detecting weight-related strain, wherein the at least two weight on wheels sensors are tuned to a weight range having an upper weight limit approximately equal to the weight on wheels threshold, and the gross weight fiber optic sensor is tuned to a weight range having a lower weight limit of approximately empty gross weight of the aircraft.

5. The system of claim 4, further comprising a computing device, wherein gross weight measurement using detected data from the gross weight fiber optic sensor is a static measurement and weight on wheels measurement using detected data from the at least two weight on wheels sensors is a dynamic measurement.

6. The system of claim 4, further comprising a computing device receiving first detected data from the at least two weight on wheels sensors and second detected data from the gross weight fiber optic sensor, the second detected data separate from the first detected data.

7. An aircraft having a weight on wheels threshold between a flight mode and a ground mode, the aircraft comprising:
- a landing gear assembly; and,
- a system for weight measurement including:
  - at least two weight on wheels sensors arranged on the landing gear assembly, the at least two weight on wheels sensors comprising a first fiber optic sensor mounted in a first orientation and a second fiber optic sensor mounted in a second orientation that us substantially perpendicular to the first orientation; and,
  - a computing device receiving first detected data from the at least two weight on wheels sensors related to strain on the landing gear assembly, the computing device calculating a rate of change of the strain over time to determine when the landing gear assembly reaches the weight on wheels threshold.

8. The aircraft of claim 7, further comprising a gross weight fiber optic sensor on the landing gear assembly, the computing device receiving second detected data from the gross weight fiber optic sensor, the second detected data separate from the first detected data.

9. A method of measuring weight for the aircraft of claim 7, the method comprising:
- arranging a first weight on wheels sensor on the landing gear assembly in a first orientation, and a second weight on wheels sensor on the landing gear assembly in a second orientation that is substantially perpendicular to the first orientation, the first and second weight on wheels sensors comprising fiber optic sensors;
- sending the first detected data from the first and second weight on wheels sensors to the computing device; and
- computing, by the computing device, the rate of change of the strain over time to determine when the landing gear assembly reaches the weight on wheels threshold.

10. The method of claim 9, further comprising filtering out vibrations of the aircraft with a band pass filter.

11. The method of claim 9, further comprising arranging a gross weight fiber optic sensor on the landing gear assembly, sending second detected data from the gross weight fiber optic sensor to the computing device, and computing, by the computing device, a gross weight of the aircraft using the second detected data.

12. The method of claim 11, further comprising computing, by the computing device and the second detected data, a center of gravity of the aircraft.

13. The system of claim 1, wherein the gross weight fiber optic sensor includes at least two sensor elements, the at least two sensor elements including a first fiber optic sensor element mounted in a first orientation and a second fiber optic sensor element mounted in a second orientation that us substantially perpendicular to the first orientation.

14. The system of claim 4, wherein the gross weight fiber optic sensor includes at least two sensor elements, the at least two sensor elements including a first fiber optic sensor element mounted in a first orientation and a second fiber optic sensor element mounted in a second orientation that us substantially perpendicular to the first orientation.

* * * * *